UNITED STATES PATENT OFFICE.

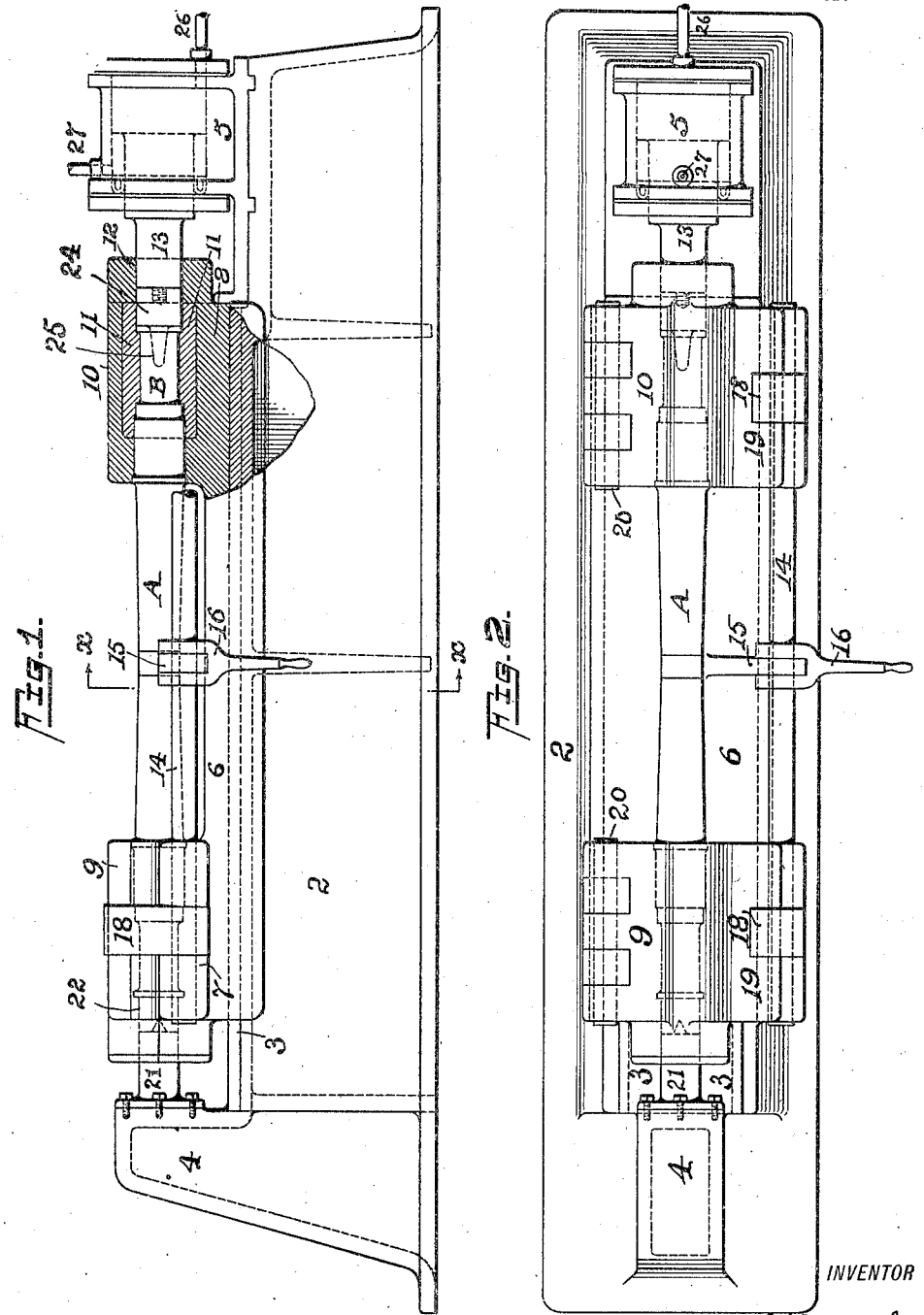

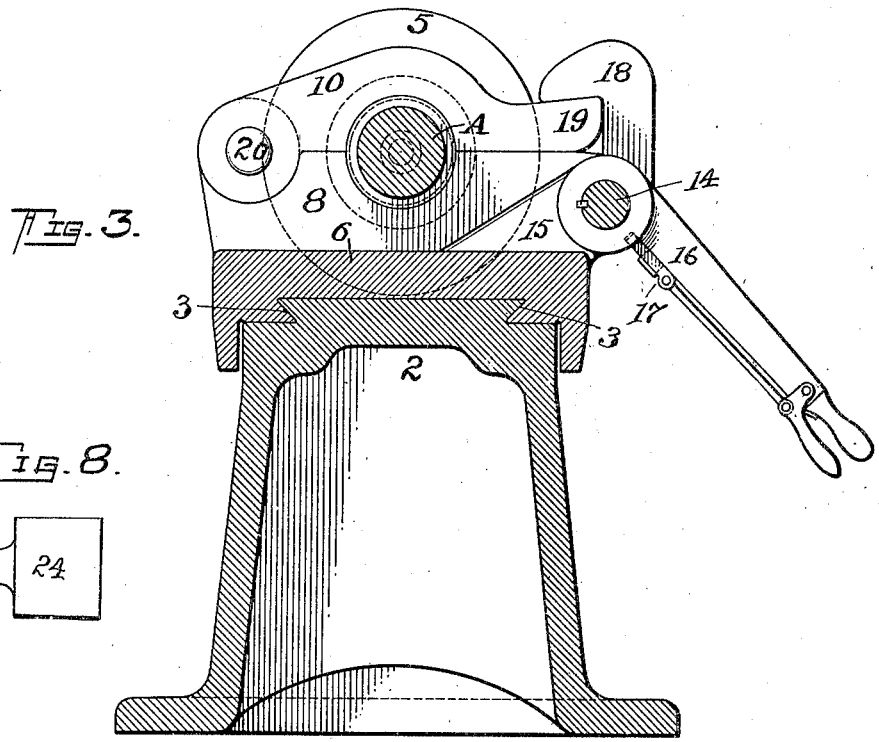

ALBERT C. MURPHY, OF NEW YORK, N. Y.

RECLAIMED AXLE.

1,341,432.   Specification of Letters Patent.   Patented May 25, 1920.

Application filed August 4, 1917. Serial No. 184,502.

*To all whom it may concern:*

Be it known that I, ALBERT C. MURPHY, a citizen of the United States, and resident of New York city, county of New York, and State of New York, have invented an Improvement in Reclaimed Axles, of which the following is a specification.

The object of my invention comprehends the reclaiming of worn car axles by upsetting and reforging the bearings and flanges, and otherwise strengthening the axle ends that they may thereafter perform the duties required of new axles.

In carrying out my improved method, the worn axle has its two ends subjected to treatment successively or simultaneously, as preferred, and it will suffice to specifically describe the steps employed in rebuilding one end and the means suitable for so doing. The worn axle end is brought to a welding temperature and when held within properly shaped dies, is subjected to the action of a plunger die which while upsetting the end also drives into the end an expanding die which displaces sufficient metal from the interior to fill out the bearing and flange to the predetermined original size of the axle before being worn. While this operation may be performed without removing the worn flange, I prefer that the worn flange shall be first turned off so that in this reformative operation the new flange shall be forged out of the solid metal of the bearing.

While the reforged axle bearing is thus brought to the size required with full diameter of bearing and thickness of end flange, together with the proper shape of the fillets, and may be used in this form (after returning the bearings and flange), I prefer to fill the hole so forged in the end of the axle by a tightly fitting plug driven in and electrically welded or otherwise secured in place, to impart a greater solidity and more durability under rough usage, such as a freight car axle is subjected.

My improvements will be better understood by reference to the accompanying drawings, in which:—Figure 1 is a side elevation (with part in section) of a machine suitable for use in carrying out my improved method, and showing an axle in process of treatment; Fig. 2 is a plan view of the same; Fig. 3 is a cross section of the same, taken on line *x—x* of Fig. 1; Figs. 4, 5, 6 and 7 are sectional elevations showing a worn axle end and the reclaimed structure during and after being subjected to my improved method; Fig. 8 is an elevation of one of the dies employed in forging the axle end; and Fig. 9 is a side elevation of a modified form of the forging machine.

Referring to the machine shown in Figs. 1, 2, 3 and 8, in which the reforging of the worn axle is performed, there are provided suitable dies for holding the axle and shaping the bearing and collar. These means may be described as follows: 2 is the main frame or bed having longitudinal guides 3 and an abutment 4 at one end. Supported upon the guides 3 is an adjustable frame 6 which may be shifted slightly on the bed 2 to suit axles of different lengths. This frame 6 has at one end an axle rest 7 shaped to receive the axle end and provided with the hinged clamp 9, the same being hinged at 20 so as to fit over the axle end to hold it in position. The other end of the frame 6 is also provided with an axle rest 8 for the other end of the axle, and is likewise provided with a clamp 10 hinged at 20 and adapted to fit over the axle end to hold it tightly during the forging operation. Both of the clamps 9 and 10 have flanges 19 at their ends most distant from the hinges 20 and which are adapted to be engaged by the latch hooks 18 (Fig. 3). These latch hooks 18 are secured to the rock shaft 14 journaled in the axle rests 7 and 8 and also in the bearing 15 at the intermediate position. This rock shaft is secured to an operating lever 16 which straddles the intermediate bearing 15 and is provided with a suitable detent mechanism to hold it in adjusted locking position.

The rest block 8 and clamp 10 are recessed and lined with hardened steel dies 11, which are bored out to the proper diameter of the axle and flange to which the axle end is to be expanded. It is manifest that this diameter will be slightly in excess of the finished diameter of the axle bearing so as to allow for turning and grinding of the latter after the reclaiming forging.

21 is a thrust support secured to the abutment 4 of the bed 2 and fits into the end of the axle rest parts 7 and 9; and in addition to this thrust support, I provide a thrust block 22 of the same diameter and resting against it and inclosed in the parts 7 and 9 to directly receive the end thrust of the axle A during the forging of the other end.

At the forging end of the apparatus, I provide a hydraulic press 5 secured to the bed and having a plunger or piston 13 extending forward in alinement with the axle axis and working in a suitable bore 12 of the axle rest 8 and clamp 10; and said plunger 13 is provided on its end with the forging tool 24 which consists of a die of cylindrical shape having a diameter equal to that of the flange to be forged upon the axle end and having a piercing nose 25 (Fig. 8) which is forced into the end of the axle during the forging operation. The die 24 is suitably secured to the plunger 13 so that it may be withdrawn from the axle end after the forging operation. The hydraulic press may be supplied with water under pressure by the pipes 26 and 27 controlled by suitable supply and exhaust valves of usual construction (not shown).

The operation will now be understood from the following explanation of the use of said apparatus: The worn flange C of the bearing B of the discarded axle A is turned off in whole or in part; and after the axle end is brought to a welding heat, the axle is placed in the forging machine and clamped in position as shown in Figs. 1 and 2. The hydraulic plunger is then advanced and forces the die 24 toward the confined end of the axle with the result that the nose 25 pierces the axial center of the axle end and radially expands the axle bearing part B and upsets the metal at the outer end to fill out the flange groove of the die 11; so that not only is the full diameter of the bearing B secured, but also the full diameter and thickness of the flange C, whereby in the reclaimed axle these parts correspond to the original sizes indicated in dotted lines at D in Fig. 4, the solid lines therein being intended to show the worn nature of these portions of a discarded axle.

After the forging operation is completed, the shape of the axle end will be as indicated in Fig. 5 in which B' is the axle bearing, C' the flange, E and F the fillets, and G the pierced end from which the metal was displaced to fill out the other parts mentioned to maximum size. It will be understood that the proportioning of the nose 25 to insure a proper displacing of necessary metal is a very important feature, but as the extent of wear would vary somewhat the maximum displacement necessary, the size of the nose should in all cases be slightly in excess of the theoretical size required. The axle may be employed without filling or plugging the hole G, but I prefer that the hole shall be plugged as it stiffens the bearing and flange. To accomplish this, I provide a plug H of accurate shape to tightly fit the hole G and this is forced in, preferably after the forging operation, and while the axle is still heated, or it may be done as a secondary operation and with the axle reheated or cold as desired. The advantage of inserting the plug H in the heated axle is evident from the fact that on cooling the axle end will shrink and firmly grip the plug. The plug may then be electrically welded at its outer end to the end of the axle, as indicated at I in Fig. 6. When this is done, the surface of the end of the axle and plug may be turned smooth as at J in Fig. 7. The axle end thus formed, when turned and ground, will be in all material respects equal to the original axle and these results are attainable at a moderate cost for the reclaiming operations.

I have described the complete method of reclaiming one end of the axle A, but it is to be understood that when the axle has had one end brought to the condition shown in Fig. 5, it is taken from the machine and after the other end is heated to a welding heat, it is replaced in a reversed position and the other end treated. When both ends have been brought to the condition shown in Fig. 5, the plugging operations are preferably performed as a secondary operation.

It will also be understood that though I prefer to remove the old worn flange C (Fig. 4) and form an entirely new flange, this is not essential as the old flange may be brought to such a welding heat that it will not weaken the filled out flange of which it may form a part.

The plugging of the hole G by the plug H will not only increase the strength, but also by the presence of the hole and the separation of the metal of the wall of the hole and plug metal, the tendency to crystallization in use will be materially decreased.

While in Figs. 1 and 2, the machine is intended to forge one end only of the axle at a time, nevertheless this forging operation may be performed upon both ends at the same time by providing both ends of the machine with forging presses and dies such as indicated in Fig. 9, in which the axle rest 8 and clamp 10, the press 5 and plunger 13 at one end are duplicated at the other end as shown at $8^a$, $10^a$, $5^a$ and $13^a$; but such duplication may be considered only as an expediency for rapidity of production and not as changing or modifying the essential characteristics of the method employed.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the claims.

Having now described my invention, what

I claim as new and desire to secure by Letters Patent, is:—

1. As an improved article of manufacture, a reclaimed axle having its ends each provided with bearings and flanges formed of metal in compressed state in which the inner end portion of the bearings are upset and solid and the continuity of the metal across the diameter of the outer end portion of the bearing interrupted by a recess extending inwardly for a portion only of the length of the bearing.

2. As an improved article of manufacture, a reclaimed axle having its ends each provided with bearings and flanges formed of metal in compressed state in which the inner end portion of the bearings are upset and solid and the continuity of the metal across the diameter of the outer end portion of the bearing interrupted by a recess extending inwardly for a portion only of the length of the bearing, and said recess filled by a plug forced tightly into place.

3. As an improved article of manufacture, a reclaimed axle having its ends each provided with bearings and flanges formed of metal in compressed state in which the inner end portion of the bearings are upset and solid and the continuity of the metal across the diameter of the outer end portion of the bearing interrupted by a recess extending inwardly for a portion only of the length of the bearing, and said recess filled by a plug forced tightly into place and welded at its outer end only to the axle end.

4. As an improved article of manufacture, a worn axle having its bearing ends expanded to normal size and the metal from the center portions of the axle ends displaced to provide the metal required, and solid plugs tightly fitting the spaces in the ends of the axle provided by the displacement of the metal, said plugs welded in position.

In testimony of which invention, I hereunto set my hand.

ALBERT C. MURPHY.

Witnesses:
EMILY O'REILLY,
ALFRED G. BANCROFT.